Feb. 10, 1970   H. M. EAGLESON, JR., ET AL   3,494,447
FRICTION VEHICLE BRAKING EQUIPMENT
Filed Feb. 21, 1968   2 Sheets-Sheet 1

INVENTORS.
Hodge M. Eagleson, Jr.
BY Robert C. Richards

THEIR ATTORNEYS

Feb. 10, 1970     H. M. EAGLESON, JR., ET AL     3,494,447
FRICTION VEHICLE BRAKING EQUIPMENT
Filed Feb. 21, 1968     2 Sheets-Sheet 2

INVENTORS.
Hodge M. Eagleson, Jr.
Robert C. Richards
BY Webb Burden Robinson & Webb
THEIR ATTORNEYS United States Patent Office 3,494,447
Patented Feb. 10, 1970

3,494,447
FRICTION VEHICLE BRAKING EQUIPMENT
Hodge M. Eagleson, Jr., 6212 Abbington Drive, Oxon Hill, Md. 20021, and Robert C. Richards, 928 Broadhead Road, Coraopolis, Pa. 15108
Filed Feb. 21, 1968, Ser. No. 707,062
Int. Cl. B60z 1/04
U.S. Cl. 188—4                                                  8 Claims

ABSTRACT OF THE DISCLOSURE

A friction braking device for use with tandem axle vehicles wherein the forward axle housing of the vehicle and the wheels with tires carried thereby can move forwardly and rearwardly relative to the rear axle housing to bring the front tires in to engagement with the tires on wheels of the rear tandem axle. The forward axle, its wheels, and tires normally are held out of engagement with the rear axle, its wheels, and tires by air pressure applied through piston-type air cylinders mounted on the vehicle frame when the vehicle is in motion. When air pressure is relieved, the forward axle housing and the axle carried thereby including its wheels and tires move under spring bias toward engagement with the rear axle housing, its axle, wheels and tires. Contact and frictional engagement of the tires on the wheels of the forward axle with tires on the wheels of the rear axle results in a positive brake of the vehicle.

This invention relates to vehicle braking devices, and particularly to devices used in stopping tandem axle vehicles in a controlled manner.

As is well understood, it is extremely important that heavy equipment, such as tractor-trailer rigs and the like, be under the control of the driver or operator at all times. In most heavy equipment, air-actuated devices used for braking include brake shoes which engage a standard brake drum on each wheel of the vehicle. Various types of these devices are known in the art, yet brake systems which operate on the principle of forcing a brake shoe against a brake drum are subject, in operation, to excessive heating which causes brake fade or complete loss of braking ability due to lack of positive pressure contact between brake shoes and drum.

Our invention overcomes this problem and is a vehicle brake system which provides engagement between the tires of the forward and rear axles of a tandem unit, such as are usually found associated with heavy tractor and trailer equipment. While we prefer and hereinafter describe our invention in terms of tandem axle equipment, such as tandem axle trailers, it is apparent that positive engagement of the wheels of one axle with a stationary part of the vehicle to be braked provides an equally positive vehicle brake. For example, a channel may be mounted to the frame of the vehicle and disposed such that the wheels of an axle run into engagement with the channel or the channel is moved into engagement with the wheels.

Our invention is a braking device for a multiple axle vehicle, preferably one having two axles and commonly known as a tandem axle vehicle. A main frame of the vehicle mounts a wheel frame which, in turn, mounts vehicle load-bearing means comprising, in the case of a tandem axle vehicle, a pair of spaced axle housings; each housing carries an axle therein and each axle has ground-contacting main running wheels and tires. One of the axle housings is fixed relative the wheel frame. Means for engaging the tires of the axle in the fixed housings are mounted on the wheel frame for slideable movement in translation toward and away from the fixed housing in response to means connected between the two axle housings. Such engagement means are the other housing, its axle, wheels and tires with or without a braking block mounted on the wheel frame between tires on the spaced axles. The vehicle is braked either by direct engagement of the tires on the axles in the housings or by engagement of tires of each housing with the braking block. The term vehicle load-bearing means, as used herein, describes means which support the mass of the vehicle and not solely auxiliary equipment for braking.

A clear understanding of our invention will be obtained from the following specification and its accompanying drawings, in which.

Figure 1:
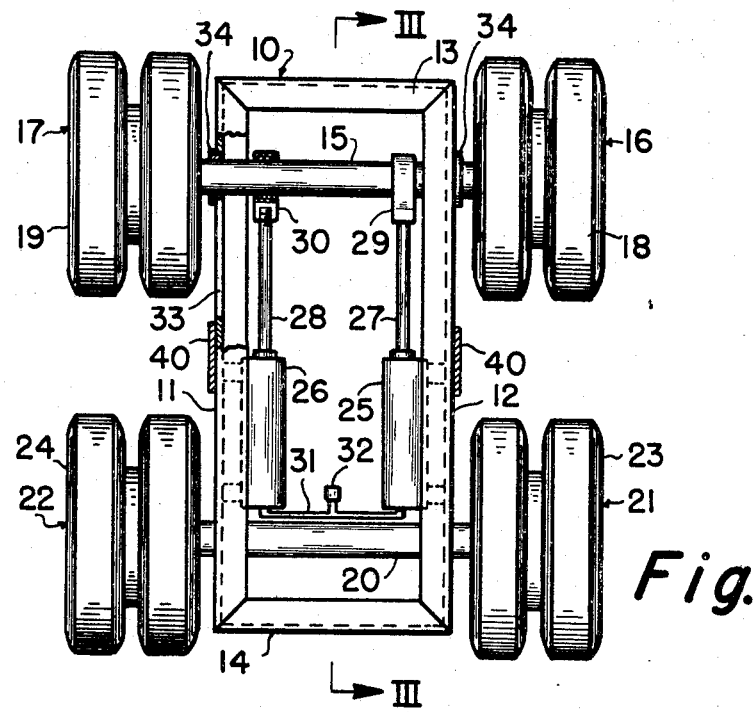
FIG. 1 is a plan view of a tandem axle unit embodying our invention showing the tandem axles in over-the-road running position.
Figure 2:
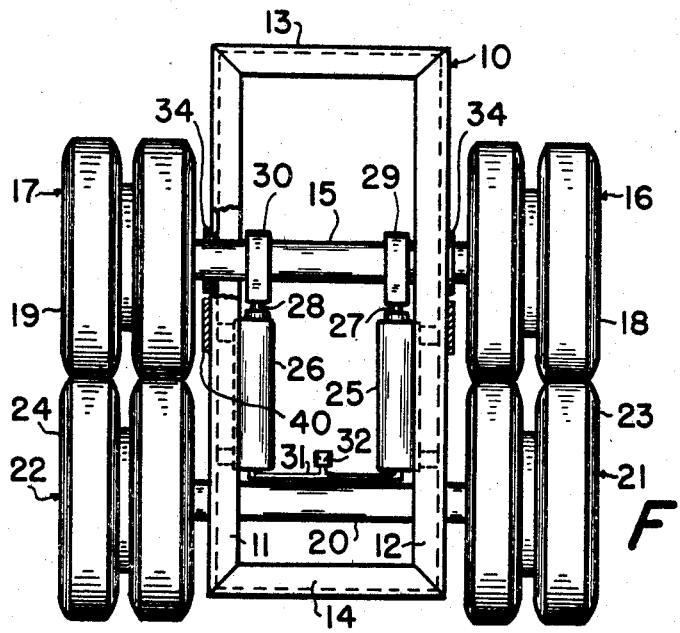
FIG. 2 is a plan view of a tandem axle unit, similar to FIG. 1, showing the wheels and tires of the forward and rear axles in positive engagement as the vehicle in braked under our system.

Referring to FIGS. 1 and 2, we have shown a vehicle wheel frame 10 comprising two side channels 11, 12 of substantially equal length which are joined together by end members 13, 14. A tandem axle unit is mounted on the frame 10 and comprises a forward axle housing 15 which carries an axle having conventional dual wheels 16 and 17 with tires 18 and 19. A rear tandem axle housing 20 is located at the rear of the vehicle wheel frame 10 and includes an axle carrying conventional dual wheels 21 and 22 with tires 23 and 24.

Between the mounted on the channels 11, 12, are a pair of air cylinders 25, 26 from which extend pistons 27, 28, respectively. The extending pistons 27, 28 are connected to axle housing 15 by means of couplings 29, 30 which are secured to the forward axle housing 15. An air line 31 having a coupling 32 for attachment to the air supply of the vehicle (not shown) is connected into air cylinders 25 and 26. In the illustration of FIG. 1, the air cylinders are open, i.e. the pistons 27, 28 are under air pressure.

In FIG. 2, a means mounted for translation into and out of a braking engagement includes a forward axle housing 15 which has been displaced rearwardly toward rear axle housing 20 such that the tires 18 and 19 engage rear tires 23 and 24 along the periphery or tread of the tires on each wheel. In this figure, the air cylinders 25, 26 are closed.

The air cylinders are opened and closed by air which is fed from a supply source (not shown) located on a tractor of a tractor-trailer combination. Normal tractor air pressure is approximately 90 pounds per square inch. We prefer a higher air pressure in order to insure, under vehicle motion, that the forward axle stays at substantially right angles to the frame as shown in FIG. 1; therefore, we use 120 pounds per square inch air pressure.

When air under pressure is applied to air cylinders 25, 26 and air cylinders opened, pistons 27, 28 are extended to force forward axle housing 15 in a direction away from the rear axle housing to space the forward and rear wheels of the tandem unit from one another. When air pressure is relieved, as shown in FIG. 2, spring means located in the air cylinders (see FIG. 6) causes the cylinders to close and the piston to retract into the air cylinder whereby the forward axle can move rearwardly in the direction of the rear axle causing the tires 18 and 19 to contact tires 23 and 24, respectively. Frictional engagement of the tires of the forward and rear axles brakes the vehicle. Since, when the vehicle is in motion, the forward and rear tires are rotating in opposite directions (instantaneously at their points of contact), a positive stop is effected.

Figure 3:
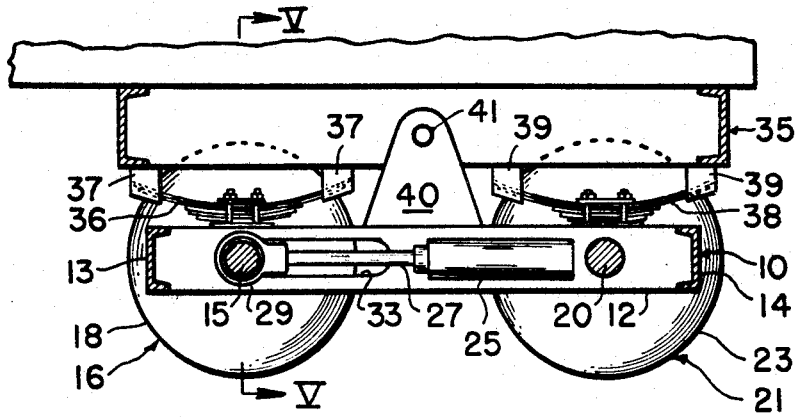
FIG. 3 is a section taken along the lines III—III of FIG. 1 and including a trailer vehicle main frame and suspension showing our invention with the tandem axles in running position.
Figure 4:
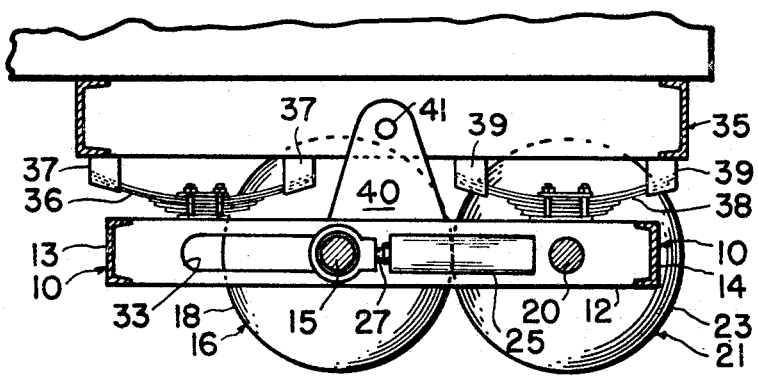
FIG. 4 is an elevation view, similar to FIG. 3 showing our invention with the tandem axles in braking position.
Figure 5:
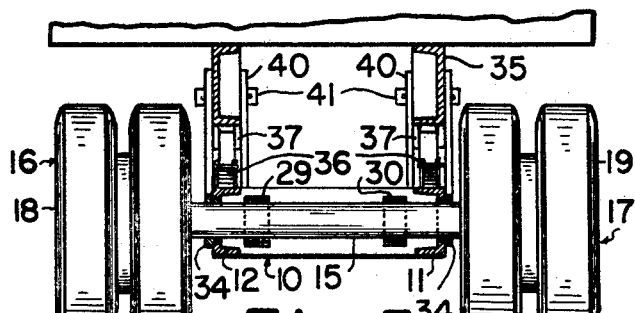
FIG. 5 is a section taken along the lines V—V of FIG. 3.

As shown in FIGS. 3–5, the forward axle housing 15 extends through a slot 33, of which there are a pair, one to a wheel frame channel 11, 12 located on a vehicle. The slot 33 may be lined with a suitable bearing material so that sliding wear on the wheel frame is reduced to a minimum. A collar 34 which may similarly be formed of a good bearing material may also be placed around the axle housing 15 to protect the axle housing and the slot against undue wear.

The forward end of wheel frame 10 is conventionally mounted on a trailer vehicle main frame 35 by spring means 36 which comprise a series of leaf springs conventional to vehicle suspension. Each end of the leaf spring is anchored to the main frame by spring blocks 37 which are welded to the frame. Similarly, the rear end of the wheel frame 10 is conventionally mounted on the rear of the main frame by spring means 38, secured to spring blocks 39 welded to the lower edge of the trailer frame. The wheel frame is spaced from and below the trailer main frame 35 and secured thereto by a pair of opposed rocker plates 40, which are pivotally mounted on pivot pins 41 journaled in pivot blocks welded to each channel of the main frame 35. The rocker plates permit the wheel frame to move independently of the trailer main frame within the limits of the leaf springs 36 and 38.

Figure 6:
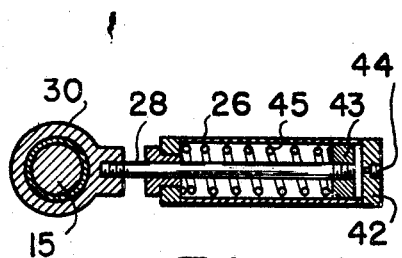
FIG. 6 is a section through a typical air cylinder useful in our invention.

In FIG. 6, we have shown the construction of a typical air cylinder 26 in open position. The cylinder includes a barrel 42 having a piston 28. A face plate 43 is secured to an end of the piston within the barrel. An air inlet 44 is provided in the barrel behind the piston face plate, such air under pressure introduced from an air supply against the face plate causes the piston to extend from the barrel. In our invention, an end of the piston is coupled to the forward axle housing 15, and, therefore, the forward axle, upon application of air, will move away from the barrel in a forwardly direction. A heavy coil spring 45 is positioned around the piston and between an end of the barrel and the face plate 43 in the barrel of the cylinder 26. The spring normally biases the forward axle housing toward the air cylinder. When air under pressure is introduced into the air cylinder 26, and the constant of the spring 45 overcome, the forward axle is held away from the rear axle. Thus, when air pressure is relieved, the forward axle is under the influence of the spring 45.

If the vehicle is proceeding in a forwardly direction and the air supply is cut off, the forward axle housing 15 remains substantially stationary relative to ground, and the rear axle advances upon it, causing the forward and rear tandem tires to engage resulting in a positive brake. Similarly, it is possible to roll a truck to a positive stop simply by advancing the vehicle slowly and relieving the air pressure to the air cylinders causing the rear axle to advance relative to the forward axle and engage to operate as a parking brake.

When the vehicle is moving over the road, in the event of an air pressure system failure in the tractor-trailer combination, our invention provides a fail-safe brake system. Since the forward axle of the tandem unit is biased in the direction of the rear axle and its wheels, upon loss of air pressure, the forward axle moves relative to the rear axle so that tire tread contact occurs between the forward and rear tires bringing the vehicle to a positive halt.

Moreover, the operator of a vehicle equipped with our invention has full use of our braking system from the tractor cab at any time, simply by operating an emergency air valve to manually relieve air pressure in the braking system, even though air pressure may be otherwise normal throughout the system.

Figure 7:
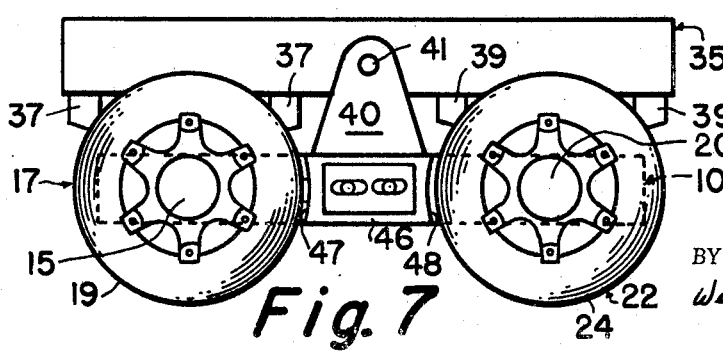
FIG. 7 is a modification of our invention in which a braking block is located between the wheels of spaced tandem axles.

In FIG. 7, we have illustrated a pair of tandem axles which are spaced apart a distance such that the tire treads of the forward and rear axle wheels are too far separated to engage. In this modification of our invention, we provide as the means mounted for translation for engagement of the tires on the rear axle a front axle housing having an axle with wheels and tires and a fixed or sliding braking or friction block 46 which is located on the outside of the wheel frame channels. The ends of each friction block 46 are shaped to correspond generally with the outside circumference of a tire which they are disposed to contact. The mounting and movement of the forward axle is substantially the same as that described in connection with FIGS. 1–5; however, in the embodiment shown in FIG. 7, when the air supply pressure is relieved, the forward axle moves rearwardly to a position where a forward axle tire tread contacts a forward end 47 of a fixed baking block to provide vehicle brake. The braking block may also slide along a slot in the wheel frame 10 similar to that in which the forward axle is mounted such that when a forward wheel tire tread engages the end 47 of the block 46, an opposite end 48 of the braking block which is also formed in a shape complementary to the rear tire tread abuts a rear tire, causing positive engagement through the block 46 between the froward and rear axle tires of the tandem unit.

In a further modification of our invention, we have substituted for one of the axles, a channel attached to the vehicle main frame or wheel frame and provide a single axle housing which slides in slots in the wheel frame channel. When air pressure is relieved, this single axle housing moves in the direction of the fixed channel to cause the tire tread on the wheels mounted on the axle in the housing to engage the channel to bring the vehicle to a positive stop.

We claim:
1. In a multiple axle vehicle having a main frame, a wheel frame mounted on the main frame, a vehicle load-bearing means mounted on the wheel frame, including at least a pair of spaced axle housings, each of the housings having an axle carried therein and each axle having ground-contacting main running wheels with tires, an improved braking device comprising:
   (a) one of the axle housings being fixed relative to the wheel frame;
   (b) means including the other axle housing mounted for slideable movement in the wheel frame for translation relative to the fixed housing; and
   (c) means connected between the axle housings for translating said slideable axle housing toward the fixed housing to effect braking of the vehicle.
2. A device as set forth in claim 1 in which the wheel frame is pivotally joined to the vehicle main frame, travel of said wheel frame about the pivot being limited by leaf suspension means located at each end of the wheel frame and connected to the main frame.
3. A device as set forth in claim 1 in which the means mounted for slideable movement includes a braking block on the wheel frame between the tires on the spaced axles for contacting a tire on each axle to apply the braking device.
4. A device as set forth in claim 1 wherein the means connected between the axle housings for translating the slideable axle housing comprises at least one air cylinder including:
   (a) a closed barrel;

(b) a piston extending through an end of the barrel and adapted for axle movement therein;

(c) an extending end of the piston being coupled to the means mounted for slideable movement in the wheel frame for translation; and (d) means for supplying air under pressure to said piston to cause it to remain extended to space said means mounted for slideable movement out of engagement with the tires of the wheels of the axle carried by the fixed housing.

5. A device as set forth in claim 4 and having within said barrel and on said piston, spring means for biasing said piston toward said barrel, such that said means mounted for slideable movement is normally biased toward said barrel and fixed axle housing, whereby to maintain spacing between the movable means and the tires of the wheels of the fixed axle air under pressure is applied to said piston to overcome the force of said spring.

6. A device as set forth in claim 1 wherein the wheel frame comprises a pair of parallel channels, one of each such channels being positioned on a side of said main frame, each channel including a longitudinal slot for slideably journaling an end of said slideable axle housing such that the axle housing can slide in said slot toward and away from the fixed axle housing in response to movement of the means for translating the slideable housing relative to the fixed housing.

7. A device as set forth in claim 6 wherein a braking block is mounted to each of said frame channels between the tires of the wheels carried by the space axles, whereby when the axles translate toward each other, the tires on the wheels carried by said axles engage the braking blocks to stop the vehicle.

8. A device as set forth in claim 2 in which the braking blocks are slideably secured to the frame channels.

References Cited

UNITED STATES PATENTS

| | | | |
|---|---|---|---|
| 95,699 | 10/1869 | Loomis | 188—37 |
| 244,813 | 7/1881 | Lippmann | 188—39 |
| 2,704,138 | 3/1955 | Gibson et al. | 188—80 |

GEORGE E. A. HALVOSA, Primary Examiner

U.S. Cl. X.R.

188—80